United States Patent

[11] 3,632,178

[72] Inventor Alfred Pitner
 Paris, France
[21] Appl. No. 51,220
[22] Filed June 30, 1970
[45] Patented Jan. 4, 1972
[73] Assignee Nadella
 Rueil-Malmaison, France
 a part interest
[32] Priority July 9, 1969
[33] France
[31] 6923322

[54] COMBINED RADIAL AND THRUST ROLLING BEARING
 8 Claims, 2 Drawing Figs.

[52] U.S. Cl. ................................................. 308/174
[51] Int. Cl. ........................................... F16c 19/04
[50] Field of Search ..................................... 308/174,
 235

[56] References Cited
 UNITED STATES PATENTS
 3,341,263  9/1967  Pitner ............................ 308/174

*Primary Examiner*—Martin P. Schwadron
*Assistant Examiner*—Frank Susko
*Attorney*—Robert E. Burns ABSTRACT: Combined radial and thrust rolling bearing comprising a cylindrical ring of the radial bearing and a radial flange connected to the ring. A localized boss defining an annular face on the flange is adapted to transmit thrust, exerted by a machine part around which the radial bearing is mounted, to an element surrounding the bearing so as to avoid concentration of thrust forces in marginal zones of thrust-transmitting means interposed between the machine part and said flange. The radial flange bears against a plane force-distributing flange which is applied against the element and is part of a sleeve having a skirt portion which surrounds the thrust-transmitting means.

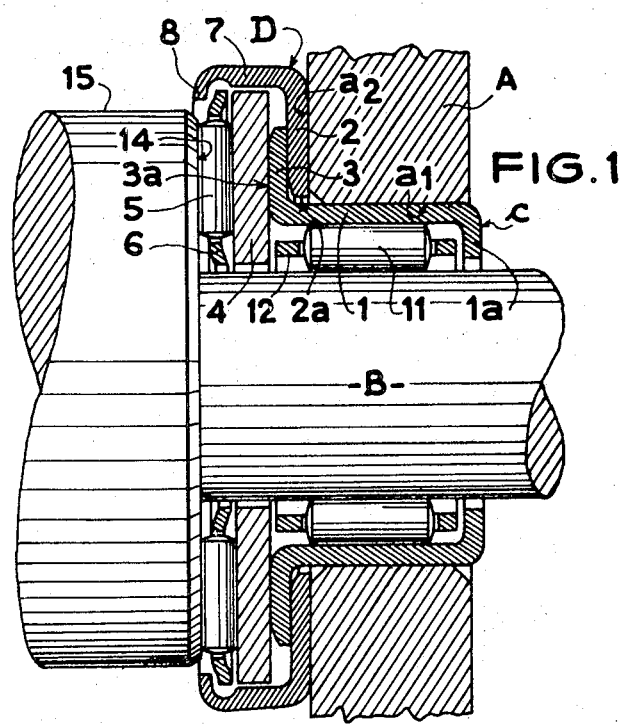
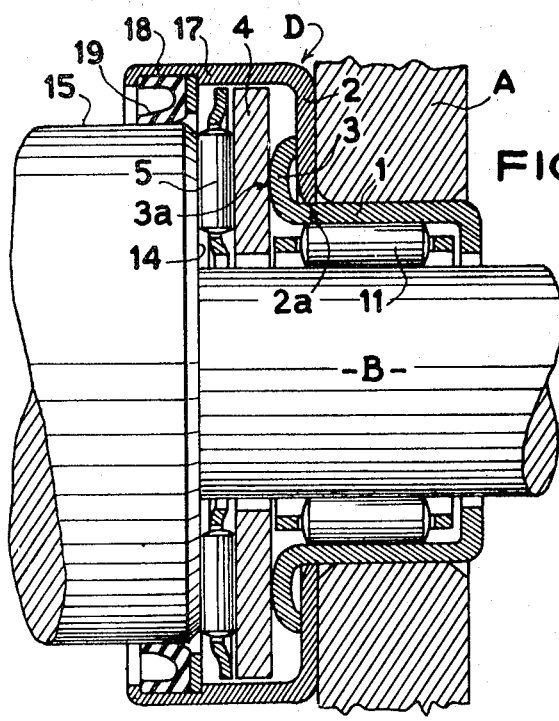

COMBINED RADIAL AND THRUST ROLLING BEARING

The present invention relates to an assembly comprising a radial needle or roller bearing and an axial thrust bearing comprising a radial flange connected to the cylindrical ring of the radial rolling bearing and adapted to transmit the thrust, exerted by the shoulder integral with the shaft or other machine part around which the radial bearing is mounted, to an element surrounding the bearing through an annular face constituting a localized boss so as to avoid a concentration of the forces in the end or marginal zones of a thrust element or elements interposed between the shoulder and the flange.

As described in our U.S. Pat. 3,341,263, such an assembly comprises a ring arrangement of thrust needles interposed between the shoulder and the flange, which constitutes a combined radial and thrust rolling bearing.

In the French Pat. addition No. 93,468, the ring arrangement of needles is replaced by a sliding and thrust plate. In both cases, the flange of the radial rolling bearing is extended radially and forms a bearing or support face which bears against the machine part, a radial skirt portion surrounding the plate or the thrust needles being integral therewith.

The object of the present invention is to provide a different arrangement wherein the radial flange on which is formed the localized annular boss bears against a plane force distributing flange which is applied against the element surrounding the bearing and is part of a sleeve whose skirt portion surrounds the thrust element or elements.

Such an arrangement, which replaces the single part of the aforementioned U.S. Pat. and French Pat. addition to the latter by two distinct parts, has the advantage of resulting in an improved transmission of the axial forces exerted by the shoulder owing to the fact that the force distributing face has normally a radial dimension exceeding the bearing or support face provided in said U.S. Pat. and French Pat. addition.

The proposed arrangement of supporting the boss on the force distributing face ensures that no radial component of the axial forces is applied, through the boss, on the peripheral portion of the rolling bearing—thrust bearing assembly. This result can be enhanced by adopting another arrangement in which the inner edge portion of the plane portion of the sleeve, constituting a force-distributing face, surrounds with clearance the cylindrical part of the ring so as to ensure that the sleeve undergoes no stress when fitting the ring in the machine part receiving it.

The sleeve can also be centered on contact with the cylindrical part of the ring by the inner edge of the force distributing face. This centering makes it possible to provide at the free end of the skirt portion of the sleeve a sealing means which cooperates with a face adjacent the outer edge of the shoulder.

Further features and advantages of the invention will be apparent from the ensuing description with reference to the accompanying drawing.

In the drawing:

FIG. 1 is an axial sectional view of a combined radial and thrust rolling bearing according to one embodiment of the invention, and FIG. 2 is a modification of the combined bearing according to the invention.

Fitted in a bore $a_1$ in a wall A is the cylindrical part 1 of a ring C of sheet metal which is press drawn and calibrated in accordance with a known method and contains needles 11 located in a cage 12. The ring C comprises a radial flange 3 which bears against a plane radial flange 2 which bears against a face $a_2$ of the wall A and is part of a sleeve D surrounding the cylindrical part 1 of the ring C. The face 3a on the side of the flange 3 opposed to the flange 2, which is plane, constitutes an annular support or bearing boss for a plate 4 which surrounds with clearance the shaft B and acts as an axial raceway for elements 5, for example needles, which are retained in a cage 6. The sleeve D comprises a cylindrical skirt portion 7 which axially extends the plane flange 2, acts as means for centering the plate 4, and has a free edge portion 8 which is formed over inwardly toward the axis and axially retains the assembly comprising the needles 5, the cage 6 and the raceway plate 4. As the cage 12 of the radial bearing is also retained axially between an end portion 1a which is formed over toward the axis of the cylindrical part 1 and a portion of the plate 4 adjacent the shaft B which bears against the flange 3, the constituent parts of the combined rolling bearing are inseparable.

The radial flange 2 of the sleeve D constitutes a face for distributing the axial forces exerted by the shoulder 14 of the shaft B through the thrust rolling bearing and the boss 3a.

In FIG. 1 the inner edge 2a of the sleeve D surrounds with clearance the cylindrical part 1, but the edge 2a shown in FIG. 2 is in contact with the ring C so that the sleeve D is centered relative to the latter. Moreover, this contact may be a tight contact. The skirt portion 17 shown in FIG. 2 supports at its free end a sealing means 18 whose flexible ring 19 is in sliding contact with a cylindrical face 15 provided on the shaft adjacent the shoulder 14. The presence of this sealing means 18 implies that the skirt portion 17 has an axial dimension exceeding that of the skirt portion 7 shown in FIG. 1. This increase in dimension is made possible by the fact that the skirt is part of an element, namely the sleeve D, which is produced independently of the ring C. This affords more freedom in the choice of its shape and size.

For the same reason, the skirt portion 7 or 17 may retain a counterplate interposed between the shoulder 14 and the needles 5.

According to the disclosure of the aforementioned patent, the radial dimension of the boss 3a which is plane in FIG. 1 and curved in FIG. 2, is less than the length of the needles 5. This arrangement, in combination with the location of this boss approximately in the region of the mean circumference of the ring arrangement of needles, ensures that there is no concentration of forces at the ends of the needles.

The flange 3 can undergo a selected treatment imparting thereto less hardness than the cylindrical part 1, which acts as a raceway for the needles 11 of the radial bearing, so as to avoid any excessive stress in this flange, when the cylindrical part 1 is fitted in the bore $a_1$, and improve its adaptation to the axial forces.

Various modifications can be adopted. Thus, the independent plate 4 may comprise means for retaining the cage 6, as described in the U.S. Pat. No. 2,997,349.

Likewise, the sleeve D may be attached to the ring C by an adhesion which implies, in the case shown in FIG. 2, use of a material such as araldite inserted in the concave part of the curved flange 3.

Having now described my invention what I claim and desire to secure by Letters Patent is:

1. A combined radial rolling bearing and thrust rolling bearing comprising a cylindrical ring of the radial bearing, a radial flange which is connected to said cylindrical ring and has a localized boss defining an annular face and is adapted to transmit thrust, exerted by a shoulder integral with a machine part around which the radial bearing is mounted, to an element surrounding the bearing through said annular face so as to avoid concentration of thrust forces in marginal zones of thrust-transmitting means interposed between said shoulder and said flange, said radical flange bearing against a plane force-distributing flange which is applied against said element and is part of a sleeve having a skirt portion which surrounds the thrust-transmitting means.

2. A combined bearing as claimed in claim 1, wherein said plane force-distributing flange has an inner edge which surrounds with clearance the cylindrical part of said ring so that said sleeve is free to move radially.

3. A combined bearing as claimed in claim 1, wherein said plane force-distributing flange has an inner edge in contact with the cylindrical part of said ring so that the sleeve is centered relative to the latter.

4. A combined bearing as claimed in claim 3, wherein said force-distributing flange has an inner edge which is an interference fit on the cylindrical part of said ring.

5. A combined bearing as claimed in claim 3, wherein said skirt portion has a free end portion, sealing means being carried by said free end portion and adapted to cooperate with a face adjacent an outer edge of said shoulder.

6. A combined bearing as claimed in claim 1, wherein said sleeve and said ring are interconnected by adhesion between said force-distributing flange and said radial flange.

7. A combined bearing as claimed in claim 1, wherein said thrust-transmitting means are needles and said skirt portion retains a rolling counterplate adapted to be interposed between said shoulder and said needles.

8. A combined bearing as claimed in claim 1, wherein said thrust-transmitting means is a plate member.

* * * * *

UNITED STATES PATENT OFFICE
CERTIFICATE OF CORRECTION

Patent No. 3,632,178        Dated January 4, 1972

Inventor(s) ALFRED PITNER

It is certified that error appears in the above-identified patent and that said Letters Patent are hereby corrected as shown below:

In the heading to the patent, the third line of item "[73] Assignee" should read:

--undivided one-half interest--

Signed and sealed this 30th day of April 1974.

(SEAL)
Attest:

EDWARD M. FLETCHER, JR.
Attesting Officer

C. MARSHALL DANN
Commissioner of Patents